US011687946B2

(12) United States Patent
Arnold et al.

(10) Patent No.: US 11,687,946 B2
(45) Date of Patent: *Jun. 27, 2023

(54) SYSTEMS AND METHODS FOR DETECTING COMPLAINT INTERACTIONS

(71) Applicant: NICE Ltd., Ra'anana (IL)

(72) Inventors: Steven Richard Arnold, Canton, GA (US); Katie Truong, Coppell, TX (US); Robert William Morris, Decatur, GA (US)

(73) Assignee: Nice Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/481,094

(22) Filed: Sep. 21, 2021

(65) Prior Publication Data
US 2022/0005052 A1 Jan. 6, 2022

Related U.S. Application Data

(63) Continuation of application No. 16/693,411, filed on Nov. 25, 2019, now Pat. No. 11,157,916.

(51) Int. Cl.
G06Q 30/00 (2023.01)
G06N 20/10 (2019.01)
H04M 3/493 (2006.01)
H04M 3/523 (2006.01)
H04M 3/51 (2006.01)
G06Q 30/016 (2023.01)
H04M 11/10 (2006.01)
G10L 15/16 (2006.01)

(52) U.S. Cl.
CPC .......... *G06Q 30/016* (2013.01); *G06N 20/10* (2019.01); *G10L 15/16* (2013.01); *H04M 3/4936* (2013.01); *H04M 3/4938* (2013.01); *H04M 3/5175* (2013.01); *H04M 3/5235* (2013.01); *H04M 11/10* (2013.01)

(58) Field of Classification Search
CPC ... G06Q 30/016; G10L 15/16; H04M 3/4936; H04M 11/10; H04M 3/4938; H04M 3/5175
USPC .......... 705/304; 379/265.03, 265.06, 265.07
See application file for complete search history.

(56) References Cited

U.S. PATENT DOCUMENTS

| 2016/0042359 A1* | 2/2016 | Singh ..................... G06F 40/30 704/2 |
| 2018/0225591 A1* | 8/2018 | Chandramouli ....... G06N 20/00 |
| 2019/0138595 A1* | 5/2019 | Galitsky ................ G06N 5/041 |
| 2020/0342016 A1 | 10/2020 | Morris |

* cited by examiner

Primary Examiner — Thjuan K Addy
(74) Attorney, Agent, or Firm — Pearl Cohen Zedek Latzer Baratz LLP

(57) ABSTRACT

A computer based system and method for identifying complaint interactions, including: detecting appearances of linguistic structures related to complaints in an interaction; calculating at least one sentiment metric of the interaction; and classifying the interaction as being or not being a complaint interaction based on the detected linguistic structures and the at least one sentiment metric, for example using a trained supervised learning model.

20 Claims, 4 Drawing Sheets

SYSTEMS AND METHODS FOR DETECTING COMPLAINT INTERACTIONS

PRIOR APPLICATION

The application is a continuation of prior U.S. application Ser. No. 16/693,411, filed on Nov. 25, 2019, entitled "SYSTEMS AND METHODS FOR DETECTING COMPLAINT INTERACTIONS", incorporated by reference herein in its entirety.

FIELD OF THE INVENTION

The invention relates generally to technology for detection of complaint interactions in a set of interactions, such as transcripts of calls.

BACKGROUND OF THE INVENTION

Companies may want to identify complaints or dissatisfaction of clients or customers. For example, some financial companies have to identify and report on complaints as a regulatory demand. Companies and organizations may have call centers for interacting with clients. The call centers may create and store interactions, which may be conversations or data exchanged between, typically, an agent or representative (typically human) of the company and a customer. Interactions may include, for example, voice, audio or video recordings of conversations, and/or other data such as text, e-mail or instant messaging exchanges. Interactions may be converted from one format to another, and may include more than one different format of data: e.g. an interaction may include an audio conversation and/or a text version of that conversation created by for example automatic speech recognition (ASR). Text versions of interactions may be stored and searched for.

The current process for identifying complaints is based on human agents listening to or reviewing interactions and identifying complaints which may be time consuming, e.g., it may take a human agent over one minute to analyze each interaction. In addition, the definition of a complaint may be subjective. Thus, different agents in the organization may categorize interactions differently, and the process as a whole may not be consistent and may have a low accuracy rate.

Therefore, there is a need to allow automatic analysis of interactions for detecting complaints.

SUMMARY OF THE INVENTION

A computer based system and method for detecting complaints may include: detecting appearances of linguistic structures related to complaints in an interaction; calculating at least one sentiment metric of the interaction; and classifying the interaction as being or not being a complaint interaction based on the detected linguistic structures and the at least one sentiment metric.

According to embodiments of the invention, classifying may be performed using a trained supervised learning model.

According to embodiments of the invention, the trained supervised learning model is a support vector machine (SVM) classifier, and embodiments of the invention may further include thresholding the results of the SVM classifier.

Embodiments of the invention may include training the supervised learning model using a plurality of tagged interactions.

Embodiments of the invention may include counting a number of appearances of the linguistic structures, where the classifying may be performed based on the number of appearances of the detected linguistic structures and the at least one sentiment metric.

According to embodiments of the invention, calculating the at least one sentiment metric may include: extracting phrases from the interaction; associating a sentiment score with the phrases, wherein each of the sentiment scores indicates the level of negativity of the associated phrase; calculating local weighted sentiment score versus time of the interaction; and using a minimal local sentiment score as the sentiment metric.

According to embodiments of the invention, the weighted local sentiment score may be weighed using a Gaussian weighting window.

According to embodiments of the invention, the linguistic structures may be identified in the interaction using queries defining phrases and relations between phrases.

Embodiments of the invention may include, if the interaction is classified as a complaint interaction, identifying a complaint reason for the complaint interaction using complaint reason queries.

Embodiments of the invention may include reporting the classification to a user.

A computer based system and method for classifying interactions may include: counting appearances of expressions related to complaints in an interaction; calculating at least one sentiment metric of the interaction; providing the count of appearances of the of expressions and the at least one sentiment metric as an input to a trained supervised learning model, the trained supervised learning model to classify the interaction as being or not being a complaint interaction based on the inputs.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
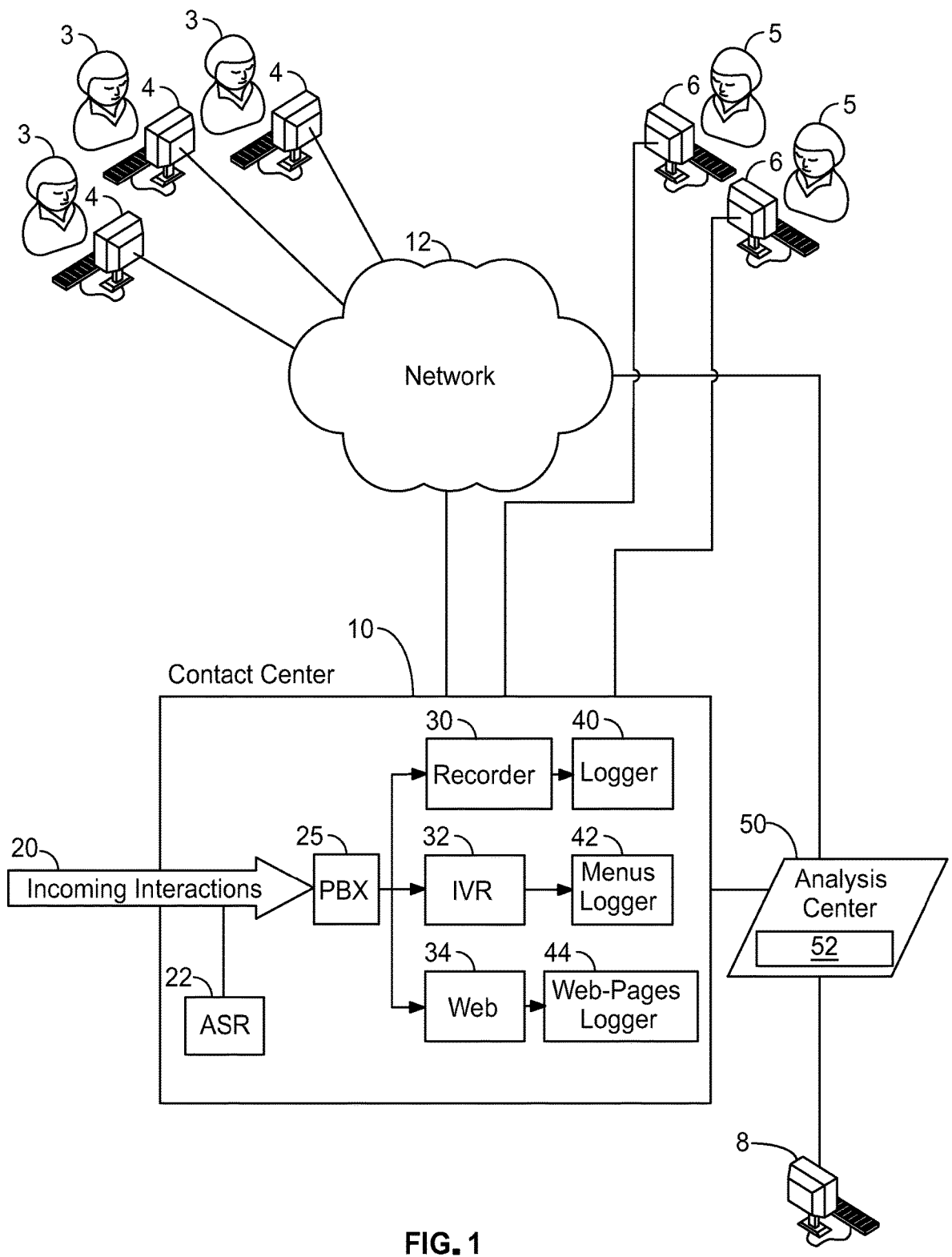
FIG. 1 is a block diagram of a system for identifying complaint interactions, according to embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Embodiments of the invention may have a computerized process take as input a large number of documents (e.g. transcripts or other derivations of interactions, which may be conversations), and may identify and count appearances of linguistic structures or expressions related to complaints in the interactions, for example using a phonetic search engine. Embodiments of the invention may further calculate at least one sentiment metric of the interaction, and may classify the interaction as being or not being a complaint interaction based on the detected linguistic structures and the at least one sentiment metric. Thus, embodiments of the invention may use a combination of query results for detecting complaint expressions and sentiment data to classify and detect complaints.

Embodiments of the invention may provide an automated system and method for identifying complaints in interactions. Although a contact center may staff agents to identify complaints in interactions, doing so may be relatively costly. For example, staffing more agents may increase the costs of operating the contact center, including agent's salary costs and supervisor workspace costs, with no increase in revenue. In addition, manual categorization may be highly subjective, as different agents in the organization may categorize interactions differently. Thus, manual categorization may not be consistent and may have a low accuracy rate. In contrast to manual categorization, the automated complaint classification according to embodiments of the invention may be consistent and may identify complaints at a higher level of precision and recall than can be done manually.

FIG. 1 is a block diagram of a system for identifying complaint interactions according to embodiments of the present invention. While FIG. 1 shows a such a system in the context of a contact center, embodiments of the invention may be used in other contexts. Incoming interactions 20 (e.g. conversations, telephone calls, IVR interactions, etc.) among people 3 (e.g., customers) and agents 5 may enter a contact center 10 and be routed for example by a PBX (private branch exchange) 25 or other equipment to relevant systems, such as interactive voice response (IVR) block or processor 32, Internet sessions or web block 34 and voice interactions block or recorder 30. People 3 may operate external user equipment 4 to communicate with agents 5 via contact center 10; and agents 5 may operate agent terminals 6 for that communication and other purposes. User terminals 8 may allow users, such as contact or data center personnel or agents, to run automatic complaint detection in interactions, and periodically export complaint calls. Incoming interactions 20 may be pre-processed and may enter the system as text data, or may be converted to text via ASR module 22.

Figure 2:
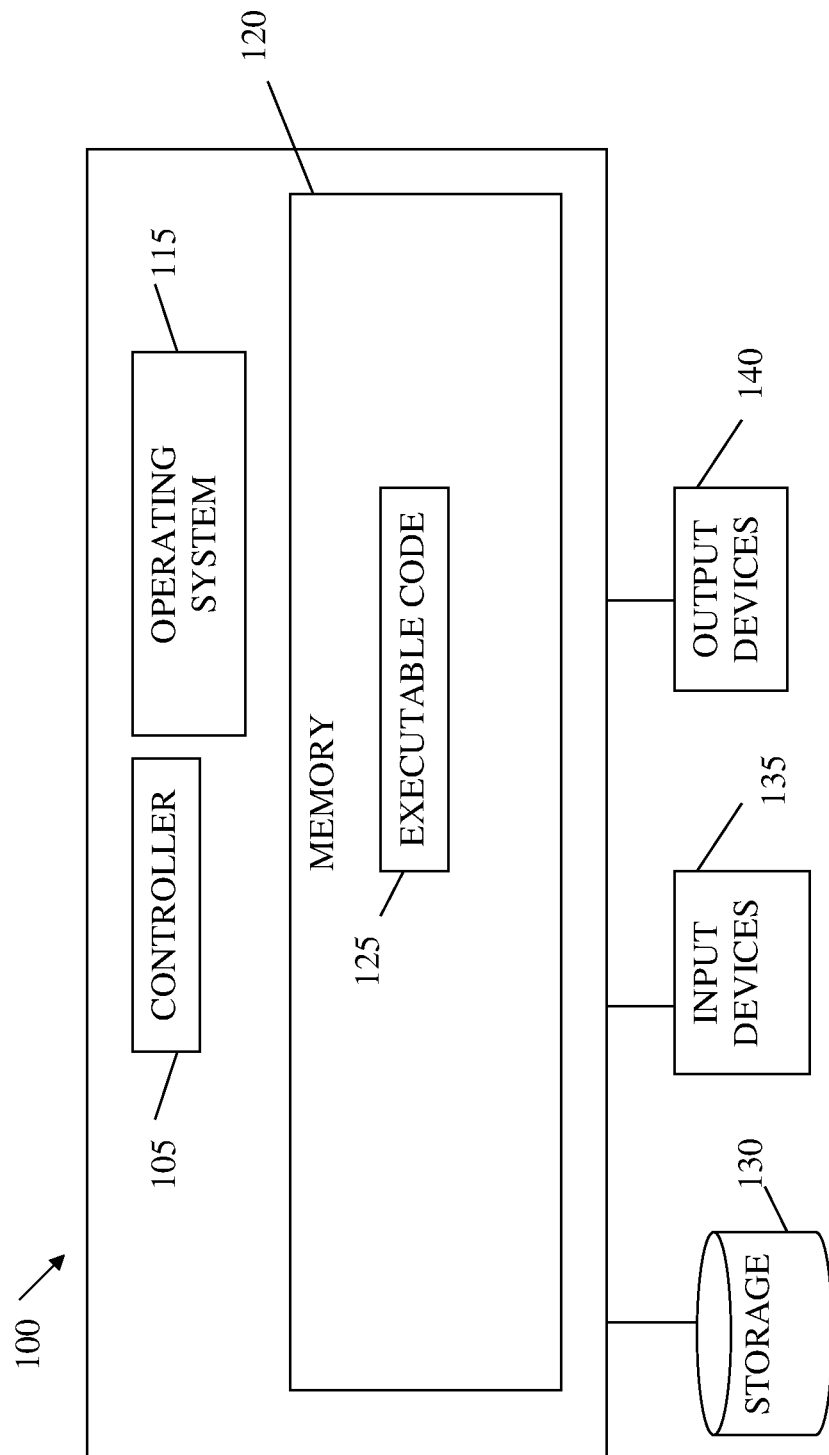
FIG. 2 is a high-level block diagram of an exemplary computing device which may be used with embodiments of the present invention.

User equipment 4, agent terminals 6 and user terminals 8 may include computing or telecommunications devices such as personal computers or other desktop computers, conventional telephones, cellular telephones, portable or tablet computers, smart or dumb terminals, etc., and may include some or all of the components such as a processor shown in FIG. 2.

Interaction data or documents may be stored, e.g., in files and/or databases. For example logger 40, menus logger 42, and web-page logger 44 may record information related to interactions, such as the content or substance of interactions (e.g. recordings and/or transcripts of telephone calls) and metadata (e.g. telephone numbers used, customer identification (ID), etc.). In the case that documents other than interactions are used, other databases may be used. The data from contact center 10 may be output, sent or exported to an analysis center 50, which may be part of contact center 10, or external to and/or remotely located from contact center 10.

Figure 3:
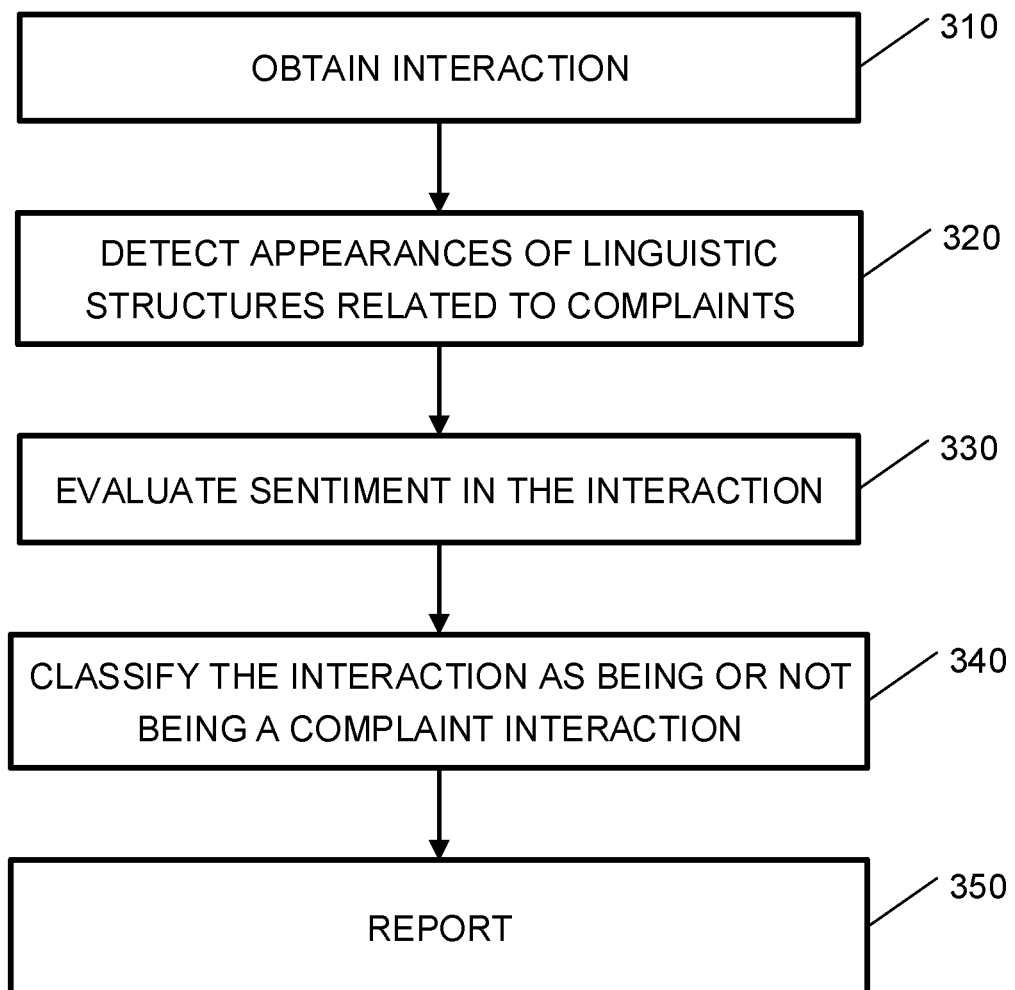
FIG. 3 is a flowchart of a method for identifying complaint interactions, according to embodiments of the present invention.
Figure 4:
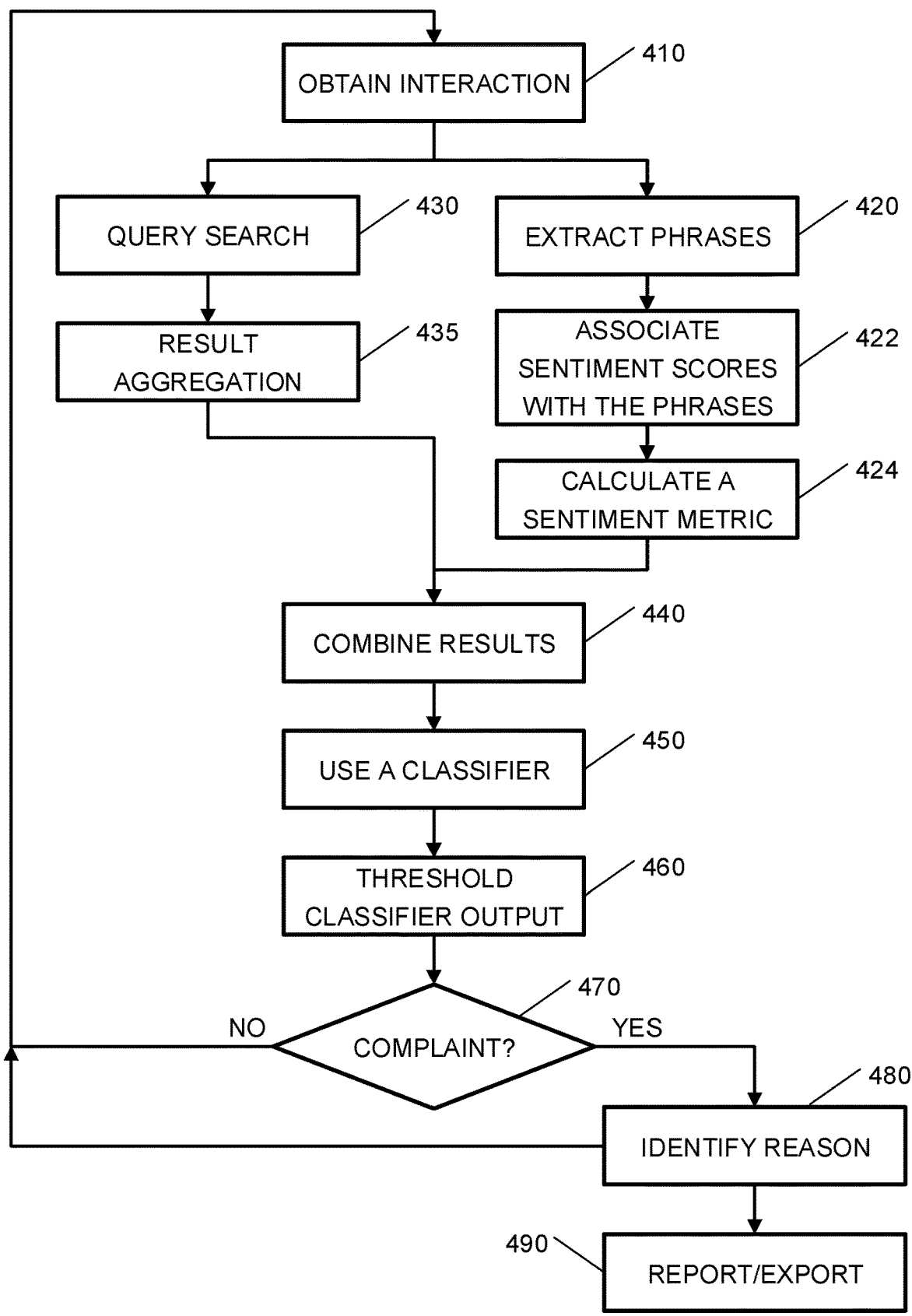
FIG. 4 is a second flowchart of a method for identifying complaint interactions, according to embodiments of the invention.

Analysis center 50 may perform functions such as those shown in FIGS. 3 and 4, and may include for example complaint identification module 52 which may be or may be implemented as software code for detecting complaints, dissatisfaction or disputes in interactions as disclosed herein. For example, complaint identification module 52 may include a classifier such as a support vector machine (SVM) classifier for classifying interactions. Analysis center 50 may communicate with one or more user terminals 8 to for example provide visualizations.

One or more networks 12 may connect equipment or modules not physically co-located, for example connecting external user equipment 4 to contact center 10, and contact center 10 to analysis center 50. Networks 12 may include for example telephone networks, the Internet, or other networks. While in FIG. 1 contact center 10 is shown passing data to analysis center 50, these modules may communicate via a network such as networks 12.

Web block 34 may support web interactions over the Internet (e.g. operate web pages which may be executed in part on user equipment), IVR block 32 may provide menus and other information to customers and for obtaining selections and other information from customers, and recorder 34 may process or record voice sessions with customers. It may be appreciated that contact center 10 presented in FIG. 1 is not limiting and may include any blocks and infrastructure needed to handle voice, text (e.g., SMS (short message service), WhatsApp messages, chats, etc.) video and any type of interaction with customers.

FIG. 2 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140. Each of modules and equipment such as contact center 10, ASR module 22, PBX 25, IVR block 32, voice interactions block or recorder 30, menus logger 42, connect API 34, analysis center 50, external user equipment 4, agent terminals 6, user terminals 8, and other modules discussed herein may be or include a computing device such as included in FIG. 2, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data such as queries, documents, interactions, etc.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 3 and 4, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as documents or interactions may be stored in a storage 130 and may be loaded from storage 130 into a memory 120 where it may be processed by controller 105. In some embodiments, some of the components shown in FIG. 2 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

FIG. 3 is a flowchart of a method for identifying complaint, dissatisfaction or dispute-related interactions according to embodiments of the present invention. While in some embodiments the operations of FIG. 3 are carried out using systems as shown in FIGS. 1 and 2, in other embodiments other systems and equipment can be used.

In operation 310 interactions may be received or obtained. For example, documents containing transcripts of interactions, or other documents, may be produced or obtained. For example, ASR (e.g. using ASR module 22, e.g. executed by a processor) may be used to process interactions such as telephone calls (e.g. audio recordings), to produce text transcripts or documents. While transcripts of interactions are discussed herein, documents other than transcripts may be used, and ASR processing need not be used. A large corpus of documents (e.g. 50,000 to 500,000, or over a million) such as transcripts to be analyzed may be processed or created.

In operation 320, appearances of linguistic structures, linguistic patterns or expressions related to complaints may be detected in an interaction. In some embodiments, the number of appearances or instances of the linguistic structures or expressions may be counted. The linguistic structures (also referred to herein as linguistic patterns or expressions) may include for example words, phrases and relations between words and phrases. In some embodiments, the linguistic structures may be detected by searching the interactions (e.g., transcriptions of the interactions) using query system technology such as Nexidia phonetic search engine, e.g. as part of analysis center 50. Queries may be used by the query system to search for linguistic structures or expressions in the interactions. A query may define the linguistic structure or expressions searched for. For example, the query may define phrases or subexpressions and relations between phrases and subexpressions. The query search results may include the detected queries and the location (or locations) of the detected queries in the interaction.

In operation 330, sentiment data or ratings of the interaction may be calculated or estimated. The sentiment data may include at least one sentiment metric of the interaction.

In operation 340, a combination of the detected linguistic structures (e.g., the query results) and the at least one sentiment metric may be used for classifying the interaction as being or not being a complaint interaction. For example, the number of appearances of the detected linguistic structures or expressions and the sentiment data may be used as an input for a trained classifier, e.g. as executed by analysis center 50. The classifier may be or may include any supervised learning model, for example a support vector machine (SVM) classifier, logistic regression, random forests classifier, neural networks, and any other applicable classifier. In operation 350, the classification of the interactions may be reported to a user. In some embodiments reporting may include generating periodic (e.g., daily, weekly, etc.) export of complaint calls. In some embodiments the reports may be provided or exported into an internal database that may be used to provide reporting to authorities, e.g. the US Federal Government for compliance measurement.

Reference is now made to FIG. 4, which is a second flowchart of a method for identifying complaint interactions, according to embodiments of the invention. An embodiment of a method for identifying complaint interactions may be performed, for example, by the systems shown in FIGS. 1 and 2, but other hardware may be used.

In operation 410, an interaction may be obtained, similarly to operation 310 in FIG. 3. In operations 420-424 a sentiment metric or score may be calculated. Operations 420-424 may be an implementation of operation 330 of FIG. 3. In operation 420, phrases may be extracted from the interaction. For example, sequences of a single word, two words, three words and up to a predetermined number of words may be extracted. Phrases may be extracted and ordered sequentially, so that each word in the transcription may be extracted as a single word phrase, as a first word in a two-word phrase, a first word in a three-words phrase, and up to the predetermined number of words. After all phrases with various length starting with a certain word are extracted, the process may repeat with the following or subsequent word until the end of the analyzed interaction. Table 1 presents phrases with one to four-word sequences extracted from a transcript of an interaction, along with their start and end offsets (e.g., measured in seconds from the beginning of the interaction) in the transcript.

TABLE 1

Example phrases with one to four-word sequences extracted from a transcript of an interaction.

| Phrase | Start Offset | End Offset |
|---|---|---|
| THANK | 0 | 0.3 |
| THANK YOU | 0 | 0.5 |
| THANK YOU FOR | 0 | 0.6 |
| THANK YOU FOR CALLING | 0 | 0.9 |
| YOU | 0.3 | 0.5 |
| YOU FOR | 0.3 | 0.6 |
| YOU FOR CALLING | 0.3 | 0.9 |
| YOU FOR CALLING HOW | 0.3 | 1.0 |
| FOR | 0.5 | 0.6 |
| FOR CALLING | 0.5 | 0.9 |
| FOR CALLING HOW | 0.5 | 1.0 |
| FOR CALLING HOW MAY | 0.5 | 1.2 |

In operation 422 the extracted phrases may be associated with a sentiment score. In one embodiment the sentiment score may be provided or included in a bag-of-phrases model; other methods may be used. The bag-of-phrases model may be pre-prepared and may include various sentiment phrases that may occur in a transcripts and mapping of each sentiment phrase to a sentiment score. The sentiment scores may indicate the level of negativity (or positivity) of the associated phrase. An example of a bag-of-phrases model is shown in Table 2. In the bag-of-phrases model shown in Table 2, more negative sentiment phrases (e.g. phrases associated with conflict, dissatisfaction, complaints, etc.) are mapped to lower sentiment scores, while more positive sentiment phrases (e.g. phrases associated with happiness, satisfaction, agreement, praise etc.) are mapped to higher sentiment scores. Other mapping may be used.

TABLE 2

An example bag-of-phrases model.

| Sentiment Phrase | Sentiment Score |
|---|---|
| RIDICULOUS | −2.3 |
| TALK TO YOUR SUPERVISOR | −1.3 |
| . . . | |
| WONDERFUL | 1.2 |
| THANK YOU SO MUCH | 1.4 |

In operation 422, phrases extracted in operation 420 may be compared with sentiment phrases from the bag-of-phrases model. In case of a match, the sentiment score associated with the sentiment phrase in the bag-of-phrases model is given to the extracted phrase. The list of matched phrases, the associated sentiment scores and the location in the interaction (e.g., start and end time) may be generated in operation 422. Table 3 presents such a list of results. For example, in the results presented in Table 3 the phrase "Supervisor" was extracted from the interaction at start time (or start offset) 102.3 seconds from the beginning of the interaction, and the associated score is −1.2.

TABLE 3

An example list of matched phrases, the associated sentiment score and location in the interaction.

| Phrase | Sentiment Score (S) | Start Time (seconds) | End Time (seconds) |
|---|---|---|---|
| SUPERVISOR | −1.2 | 102.3 | 102.5 |
| RIDICULOUS | −2.3 | 120.3 | 120.6 |
| I'M FRUSTRATED | −1.0 | 130.2 | 131.0 |

In operation 424, one or more sentiment metrics for the interaction (or for parts of the interaction) may be calculated. According to some embodiments, various sentiment statistics for the interaction may be derived. In particular, several time related values may be calculated. For example, the time related values may include the quartile indicator function that is used to calculate statistics based on sentiment values in various quartiles. In addition, the running total of the sentiment values within the call, representing the running sum or overall sentiment at a particular time in a call, may be calculated. A local sentiment function may be calculated as well to find extremities of positive and negative sentiment. For the local sentiment function, a windowed average of sentiment phrases within a time window may be calculated. In particular, a Gaussian time window, or other time window, may be used. Let i and j be matched phrases indices, T be the duration of the interaction or call, N be a total number of matched phrases, $S_i$ be sentiment score of matched phrase i, $t_i$ be a start time of matched phrase i, a quartile indicator function, $Q_q(t)$, for quartile q, may be defined as equaling one in quartile q, and zero otherwise:

$$Q_q(t) = \begin{cases} 1: & \frac{(q-1)T}{4} < t \leq \frac{qT}{4} \\ 0: & \text{otherwise} \end{cases} \quad \text{(Equation 1)}$$

A running total of sentiment scores, $R_j$, up to matched phrase j may equal the sum of all sentiment score of matched phrases up to matched phrase j:

$$R_j = \Sigma_{i=1}^{j} S_i \quad \text{(Equation 2)}$$

A gaussian weighting window, W(t), may be defined by:

$$W(t) = \exp(-at^2) \quad \text{(Equation 3)}$$

A local weighted sentiment score $L_j$, versus time (or matched phrase index) may be calculated using the gaussian weighting window:

$$L_j = \Sigma_{i=1}^{N} W(t_j - t_i) S_i \quad \text{(Equation 4)}$$

Other statistics may be calculated.

Using the definitions above, one or more sentiment scores may be calculated. For example, the sentiment scores listed in Table 4 may be calculated.

TABLE 4

Example sentiment scores.

| Metric | Definition |
|---|---|
| Final Sentiment | $\sum_{i=1}^{N} S_i$ |
| Quartile q Score | $\sum_{i=1}^{N} Q_q(t_i) S_i$ |
| Maximum Sentiment | max $R_j$ |
| Minimum Sentiment | min $R_j$ |
| Peak Local Sentiment | max $L_j$ |
| Minimum Local Sentiment | min $L_j$ |

In Table 4 the final sentiment score may be the sum of all sentiment scores of all the matched phrases, quartile q sentiment score may be the sum of all sentiment scores in quartile q (four quartile sentiment scores may be calculated, one for each quartile), the maximum sentiment may be the maximum of the running total of sentiment scores, the minimum sentiment may be the minimum of the running total of sentiment scores, the peak local sentiment may be the maximum of the local weighted sentiment scores, and the minimum local sentiment may be the minimum of the local weighted sentiment scores. In some embodiments, the above listed nine sentiment scores may be calculated for each interaction and arranged in a sentiment feature vector (e.g. an ordered list of sentiment scores). In some embodiments a subset of the above listed sentiment scores, as well as other sentiment scores may be calculated and used. In some embodiments a single sentiment score may be calculated and used, for example, the minimum local sentiment. Other or different scores may be used.

In operation 430, appearances of linguistic structures or expressions related to or associated with complaints, dissatisfaction or disputes in an interaction may be detected using queries. A set of queries (e.g. queries created by a person, automatically, or semi-automatically or a set of preexisting queries) may be used to search, or may be applied to the interactions, e.g., to a set of text documents or ASR transcript data of voiced interactions, to create a collection of query or search results. For each query, search results may be generated, produced or returned. Search results may include for example a reference to or description of any (possibly zero) interactions in the searched-over corpus of interactions covered by or matching the query, e.g. documents matching the requirement of the query. Query results may include, for example, locations in the interactions of expressions or linguistic structures found by the queries (e.g., match locations), and/or an excerpt or metadata for each matching or covered document, for example an identification of each interaction (interaction ID), with a start and end time, or start and end position (expressed as time since the beginning of the interaction, sample number, phrase index, etc.), of the relevant or returned expressions or linguistic structures within the document (e.g. Start Time or Offset, End Time or Offset).

A query may define phrases, also referred to herein as subexpressions, and relations between the phrases or subexpressions. An example of a query system used with an embodiment of the present invention may be the Nexidia Interaction Analytics® system, but other query systems may be used. A query may be formed from a query language that includes searches for phrases and operators defining relations between phrases. An example of query operators defining relation between phrases or subexpressions in a query is shown in Table 5 below (other queries may be used).

TABLE 5

Example Nexidia query operators defining relation between phrases in a query.

| Operator | Description |
|---|---|
| OR() | True if any of subexpressions found |
| AND_x() | True if all of subexpressions found within x seconds |
| BEFORE_x() | True if first expression occurs before second expression |
| AND() | True if all subexpressions found in same file |
| ANDNOT_x() | True if first expression found, but not any following within x seconds |
| ANDNOT() | True if first expression found, but not any following within same file |
| FIRST_x() | True if expression found in first x seconds |
| LAST_x() | True if expression found in last x seconds |
| NOTFIRST_x() | True if expression not found in first x seconds |
| NOTLAST_x() | True if expression not found in last x seconds |

For example, phrase or subexpression #1 may be "agent hung up on me" (e.g., a caller complaining that an agent has hung up on him in a previous call) a phrase or subexpression #2 may be "she hung up on me" and phrase or subexpression #3 may be "he hung up on me". A "hung up" query may include phrases or subexpressions #1, #2 and #3, and an operator, e.g., OR0, defining the relation between these phrases or subexpressions, for Example:

$$\text{Result}_{\text{hung up query}} = \text{OR}(\text{phrase \#1}, \text{phrase \#2}, \text{phrase \#3})$$

A query match or hit of the "hung up" query may include an appearance in the interaction of one of the subexpressions "agent hung up on me", "she hung up on me" and "he hung up on me".

In operation 435 the results of the queries used in operation 430 may be aggregated or summarized, and a feature vector of the query results may be generated. According to some embodiments, the query feature vector may include an entry for each query. The number of matches for each query in an interaction (representing the number of appearances of the linguistic structures or expressions that are returned by or defined by the query) may be counted and the query feature vector may be an ordered list of the number of matches or the number of appearances of the linguistic structures or expressions. An example of query search results within a single interaction is provided in Table 6. In this example, seven queries were used. Query #3 had two matches, one in start offset 132.2 and the other in start offset 165.2, and each of queries #5 and 6 had a single match, at start offsets 58.2 and 30.2, respectively. No matches were found for the other queries. The counts for each query may be collected or aggregated to get a query feature vector as shown in Table 7.

TABLE 6

Example query results for an interaction

| Query ID | Start Offset (seconds) | End Offset (seconds) |
|---|---|---|
| 3 | 132.2 | 132.5 |
| 3 | 165.2 | 165.3 |
| 5 | 58.2 | 59.0 |
| 6 | 30.2 | 35.3 |

TABLE 7

Example query feature vector

| Count |
|---|
| 0 |
| 0 |
| 0 |
| 2 |
| 0 |
| 1 |
| 1 |

In operation 440, the semantic metric or metrics generated in operation 424 and the query results obtained in operation 435 may be combined. For example, the query feature vector and the sentiment feature vector may be concatenated to generate a unified feature vector of the interaction. Other forms of combining the semantic metric or metrics and the query results may be used. In operation 450, the combination of the semantic metric or metrics and the query results may be used as input data for a trained supervised learning model or classifier, such as an SVM classifier or other classifier. In some embodiments the classifier may classify the interaction as being or not being a complaint interaction, based on the input data. In some embodiments the classifier may provide a score or a grade. The trained supervised learning model may obtain the combination of the semantic metric or metrics and the query results as inputs, perform calculations using model weights and parameters as determined in a training process, and provide a classification, a score or a grade as an output. In operation 460, embodiments of the invention may include thresholding the results of the classifier, e.g., the score or grade provided by the classifier in operation 450 to determine whether the interaction is a complaint interaction or not.

If the interaction was classified as a complaint, operation 470, then in operation 480 the reason for the complaint may be investigated and identified. Otherwise the method may go back to obtain a new interaction in operation 410. The reason (or reasons) for the complaint may be identified using a set of queries that may be used to search, or may be applied to the interactions, similarly to operation 430. The queries used in operation 480 may be new or may be the same as or include a subset of the queries used in operation 430, as well as other queries. Each query used in operation 480 may be associated with the complaint reason. More than one query may be associated with a single complaint reason. Accordingly, a query match or hit may indicate that the reason for the complaint (or one of the reasons for the complaint) in the interaction is the reason associated with the query. For example, some of the queries used in operation 430 may relate to general complaint language, such as the "hung up" query. These queries may be used in operation 430 but not in operation 480. However, other queries used in operation 430, or queries used only in operation 480 (e.g., queries not used for detecting a complaint but used for investigating the complaint reason once a complaint was identified) may include phrases or subexpressions that are related to a specific reason of a complaint. The number of hits or matches per query may be recorded. For example, a single interaction may include three matches for queries associated with a first reason and one match of a query associated with a second reason. The method repeats to obtain a new interaction in operation 410.

In operation 490, the complaint interactions are reported and/or exported. For example, a periodic report may include a listing of the complaint interactions, including relevant metadata and a list of the complaint reason or reasons if identified (e.g., the number of matches for each query used in operation 480, or the number of matches for each query reason). In some embodiments, the entire set of complaint interactions may be exported periodically, including relevant metadata and the complaint reason or reasons if identified. The metadata may include caller identification, agent identification, call time, etc. For example, the reporting and/or export may be an automated process repeating nightly at 1:00 am.

The supervised learning model or classifier may be trained using tagged or labeled data. The tagged or labeled data may include interactions associated, e.g., by a human operator, with a tag or label indicating whether the interaction is a complaint or not. If the interaction was labeled as a complaint interaction, the label or tag may also include one or more complaint reasons. For example, the tag or label may include a primary, and possibly secondary and tertiary complaint reasons. The tagged complaint calls may be used as truth data for query development, for training and validating the supervised learning model or classifier, and for adjusting the threshold.

For example, linguistic structures or expressions related to complaints may be detected in each of the labeled interactions, similarly to operation 320 in FIG. 3 or operations 430 and 435 in FIG. 4. The sentiment in the labeled interactions may be evaluated, similarly to operation 330 in FIG. 3 or operations 420-424 in FIG. 4. The supervised learning model or classifier may be trained using the detected linguistic structures and the least one sentiment metric of the labeled interactions. For example, a sentiment feature vector (similarly to operation 424), and a query feature vector (similarly to operation 435) may be generated for each labeled interaction. The sentiment feature vector and the query feature vector may be combined or aggregated and used, together with the labels for training the supervised learning model or classifier.

The threshold and the supervised learning model or classifier may be adjusted according to precision and recall values. For example, a plurality of threshold levels may be used with the tagged complaint calls, the levels of precision and recall may be calculated for each threshold level and the threshold that provide the best values of precision and recall may be selected.

Queries (also referred to herein as rules) may be developed for use in operations 420 and 480. The queries may be developed using the labeled interactions.

Queries may be generated manually, automatically, or a combination of manual and automatic processes. Generating queries may include reviewing interactions, e.g., by a human operator, and extracting phrases and subexpressions related to complaints from the interactions, as well as relation between the phrases and subexpressions. The process may include finding equivalent or related phrases for similar complaints or complaints topics. A query may be created by specifying the phrases and the relation between phrases in the query. A query may be tested against a training dataset. For example, the training dataset may include interactions that include the linguistic patterns or expressions that the query is intended to detect. The interactions in the training dataset may be searched using the query and the precision and recall of the query may be calculated. The query may be further improved based on the test results, e.g., more phrases may be added and relation between phrases may be refined. Queries with accepted levels of precision and recall may be used for detecting frustration according to embodiments of the invention. Query generation may further include searching for high frequency n-grams (e.g., expressions including n words or phrases, where n is an integer of for example 1 to 5) present in interactions labeled as including complaints. For example, if an expression that was not identified by the human operator as a complaint is found to be very frequent (e.g., appearing more than a number of times in interactions that were labeled as including complaints) in interactions that are labeled as including complaints, a query may be generated for this expression, and tested similarly to the manually generated queries.

Embodiments of the invention may improve prior processes for identifying interactions by enabling a computerized system to analyze interactions and identify interactions associated with complaints.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for identifying complaint interactions, the method comprising, using a processor:
    detecting appearances of linguistic structures related to complaints in an interaction;
    calculating at least one sentiment metric of the interaction, wherein the calculation is performed by:
        extracting phrases from the interaction; and
        associating a sentiment score with each of the phrases;
    classifying the interaction as being or not being a complaint interaction based on the detected linguistic structures and the at least one sentiment metric; and
    providing a periodic report of the complaint interactions.

2. The method of claim 1, wherein classifying is performed using a trained supervised learning model.

3. The method of claim 2, wherein the trained supervised learning model is a support vector machine (SVM) classifier, the method further comprising thresholding the results of the SVM classifier.

4. The method of claim 2, comprising training the supervised learning model using a plurality of tagged interactions.

5. The method of claim 1, comprising counting a number of appearances of the linguistic structures, wherein the classifying is performed based on the number of appearances of the detected linguistic structures and the at least one sentiment metric.

6. The method of claim 1, wherein each of the sentiment scores indicates the level of negativity of the associated phrase and wherein calculating the at least one sentiment metric comprises:
    calculating local weighted sentiment score versus time of the interaction; and
    using a minimal local sentiment score as the sentiment metric.

7. The method of claim 6, wherein the weighted local sentiment score is weighed using a Gaussian weighting window.

8. The method of claim 1, wherein the linguistic structures are identified in the interaction using queries defining phrases and relations between phrases.

9. The method of claim 1, comprising, if the interaction is classified as complaint interaction, identifying a complaint reason for the complaint interaction using complaint reason queries.

10. The method of claim 1, comprising reporting the classification to a user.

11. A system for identifying complaint interactions, comprising:
    a memory; and
    a processor configured to:
        detect appearances of linguistic structures related to complaints in an interaction;
        calculate at least one sentiment metric of the interaction, wherein the calculation is performed by:
            extracting phrases from the interaction; and associating a sentiment score with each of the phrases; and classify the interaction as being or not being a complaint interaction based on the detected linguistic structures and the least one sentiment metric; and providing a periodic report of the complaint interactions.

12. The system of claim 11, wherein the processor is configured to classify the interaction using a trained supervised learning model.

13. The system of claim 12, wherein the trained supervised learning model is a support vector machine (SVM) classifier, wherein the processor is configured to threshold the results of the SVM classifier.

14. The system of claim 11, wherein the processor is configured to: count a number of appearances of the linguistic structures; and classify the interaction based on the number of appearances of the detected linguistic structures and the at least one sentiment metric.

15. The system of claim 11, wherein each of the sentiment scores indicates the level of negativity of the associated phrase, and wherein the processor is configured to calculate the at least one sentiment metric by:

calculating local weighted sentiment score versus time of the interaction; and using a minimal local sentiment score as the sentiment metric.

16. The system of claim 15, wherein the processor is configured to weight the weighted local sentiment score using a Gaussian weighting window.

17. The system of claim 11, wherein the processor is configured to identify linguistic structures in the interaction using queries defining phrases and relations between phrases.

18. The system of claim 11, wherein if the interaction is classified as complaint interaction, the processor is configured to identify a complaint reason for the complaint interaction using complaint reason queries.

19. The system of claim 11, wherein the processor is configured to report the classification to a user.

20. A method for classifying interactions, the method comprising:

using a processor;

counting appearances of expressions related to complaints in an interaction;

calculating at least one sentiment metric of the interaction, wherein the calculation is performed by:

extracting expressions from the interaction; and associating a sentiment score with each of the expressions;

providing the count of appearances of the expressions and the at least one sentiment metric as an input to a trained supervised learning model, the trained supervised learning model to classify the interaction as being or not being a complaint interaction based on the inputs; and providing a report of the complaint interactions.

* * * * *